Oct. 7, 1969      H. D. ROWE      3,471,195

ADJUSTABLE SEAT

Filed Jan. 25, 1968      6 Sheets-Sheet 3

INVENTOR.
HARBERT D. ROWE
BY
*George C. Sullivan*
Agent

Oct. 7, 1969   H. D. ROWE   3,471,195
ADJUSTABLE SEAT
Filed Jan. 25, 1968   6 Sheets-Sheet 4

INVENTOR.
HARBERT D. ROWE
BY
George C. Sullivan
Agent

United States Patent Office 3,471,195
Patented Oct. 7, 1969

3,471,195
ADJUSTABLE SEAT
Harbert D. Rowe, Sun Valley, Calif., assignor to Lockheed Aircraft Corporation, Burbank, Calif.
Filed Jan. 25, 1968, Ser. No. 700,585
Int. Cl. B60n 1/10; A47c 1/028; A47b 85/04
U.S. Cl. 297—101                                  6 Claims

ABSTRACT OF THE DISCLOSURE

An adjustable seat movable to a plurality of selectable relative positions. The linkage design permits the seat members to be disposed in a flat tandum relationship for berthing and also permits the back rest member to move to a plurality of preselected positions including a reversed position wherein the seat faces in the opposite direction.

Background of the invention

*Field of the invention.*—This invention relates to a seat adapted for supporting the human body, the seat being adjustable to a plurality of sedentary and recumbent positions and directions of support.

*Description of the prior art.*—Much has been done to provide support and comfort for the human body in a sedentary position, the art of seating being highly developed. However, little has been accomplished to assure such support and comfort in every possible position. Similarly, seating comfort in seats constructed for use in limited space regions has also been substantially neglected by seat designers, as have reversible seats which may be faced in either direction. Seats of the latter variety have not generally been obtainable for use in relatively restricted spaces or, if obtainable, are constructed such that the seat remains in a single stationary position while the back moves from side to side, thereby resulting in an uncomfortable seating condition.

Summary of the invention

The present invention solves these problems by providing a seat member and a back rest member suitably mounted on movable links and so related that they may be locked in any one of a plurality of selectable relative positions, from upright to berthed. The linkage design permits the back rest and the seat member to assume completely flat positions in tandum relationships for berthing. This linkage also permits the back rest member to swing over the seat member into the reversed position so that the entire seat faces in the opposite direction. In the ultimate or any intermediate position the linkage causes the seat member to shift with the back member to an appropriate angle relative to the back rest for comfortable seating. The back rest member is movable to the flat or berthed position on either side of the seat member for maximum seat flexibility.

Therefore, a primary object of this invention is to provide seating structure substantially maximizing comfort in any one of a plurality of adjustable seating or berthed positions.

Another object of invention is to provide a seat capable of being selectively moved to any one of a multiplicity of positions, including normally seated and reclining positions facing in opposite directions, or in berthed positions wherein the back rest is positioned on either alternative side of the seat member.

A further object of invention is to provide variations in embodiment wherein the linkage members inter-connecting the seat and back are arranged to permit both the back rest and the seat to lay flat.

Other objects are to provide ease of adjustability, ease and integrity of locking and unlocking in selected positions, comfortable seating in cramped quarters, and a high degree of utility.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

Figure 1:
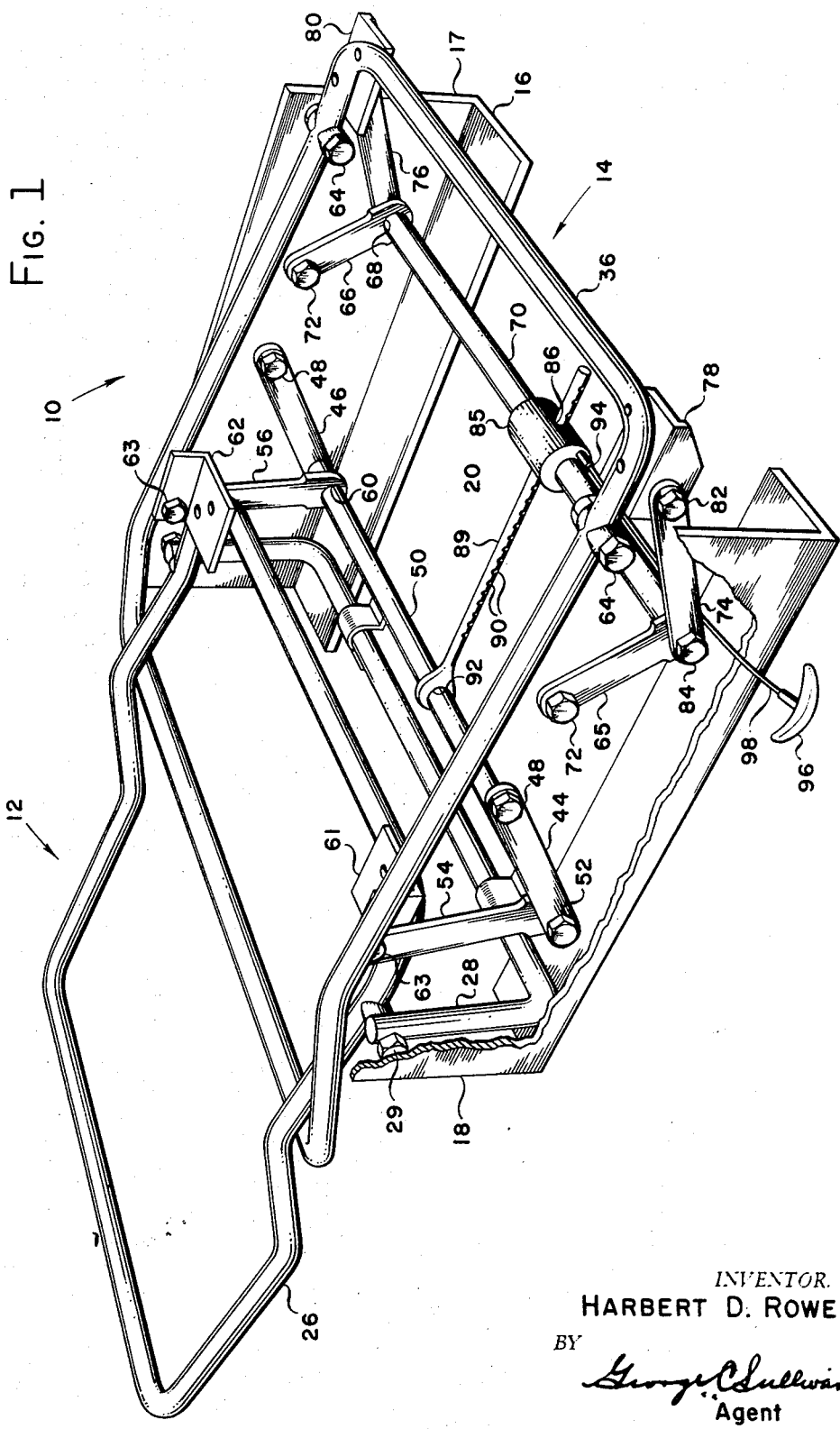
FIGURE 1 is a perspective view of the embodiment of the seat of this invention partly in phantom for clarity of illustration.
Figure 2:
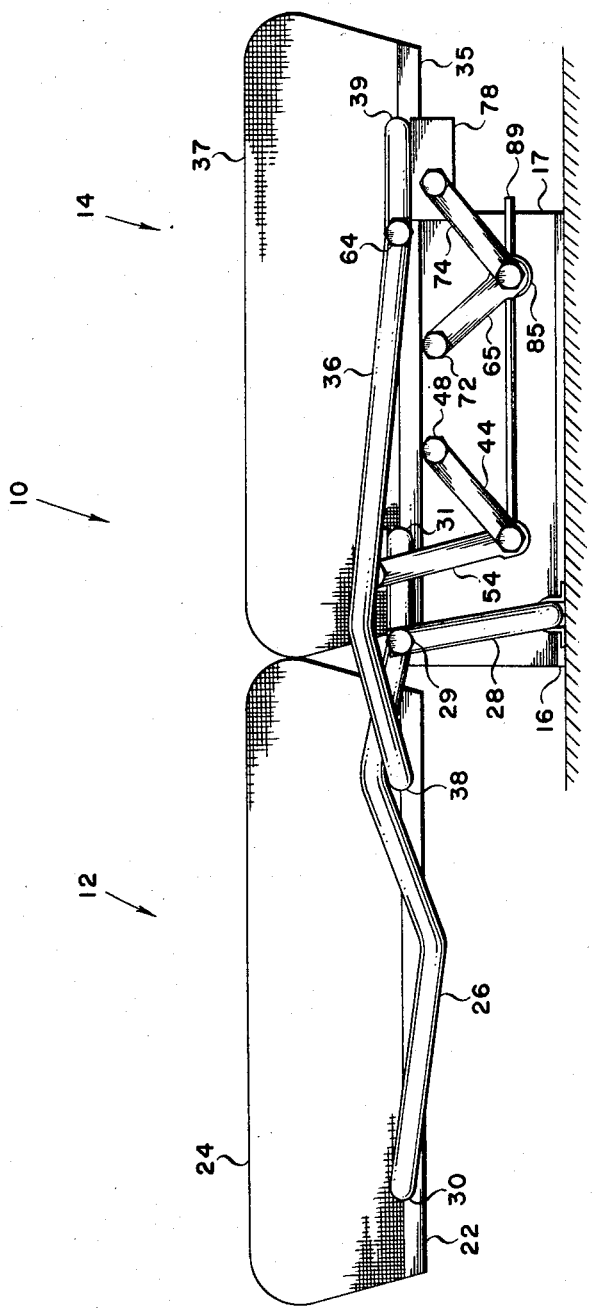
FIGURE 2 is a side elevational view of the seat of FIGURE 1 showing the seat in a left berthed position.

Referring now to the figures and, as best illustrated in FIGURES 1 and 2, the seat of this invention is generally indicated at 10 and comprises a back member 12 and a seat member 14. A base 16, having sides 17 and 18, supports the back and seat members relative to the base via a suitable linkage to facilitate movement into appropriate positions for supporting and resting the human body. Lock means, generally indicated at 20, is provided for retaining the linkage in such positions.

The back member 12 comprises a rigid back board 22 which may be of plywood or similar material adapted to carry and movably support a suitable upholstered cushion 24. The cushion 24 may be of any convenient design, but it preferably utilizes a suitable resilient material internally of a protective covering. It is also desirable that this covering be easy to clean and that it provide an attractive appearance.

The back board 22 is carried by a back supporting member 26 which is constructed as a continuous, substantially rectangular frame and is pivotally mounted to a U-shaped support member 28 by means of connectors 29. The U-shaped member 28 is fixedly secured to the cushion 24 by means of conventional attachments 30 and 31 and is pivotally mounted to the base 16 via connectors 34. Thus, in addition to its function as a back support, the entire back member 12 serves as a link of the linkage structure to be hereinafter described.

Figure 3:
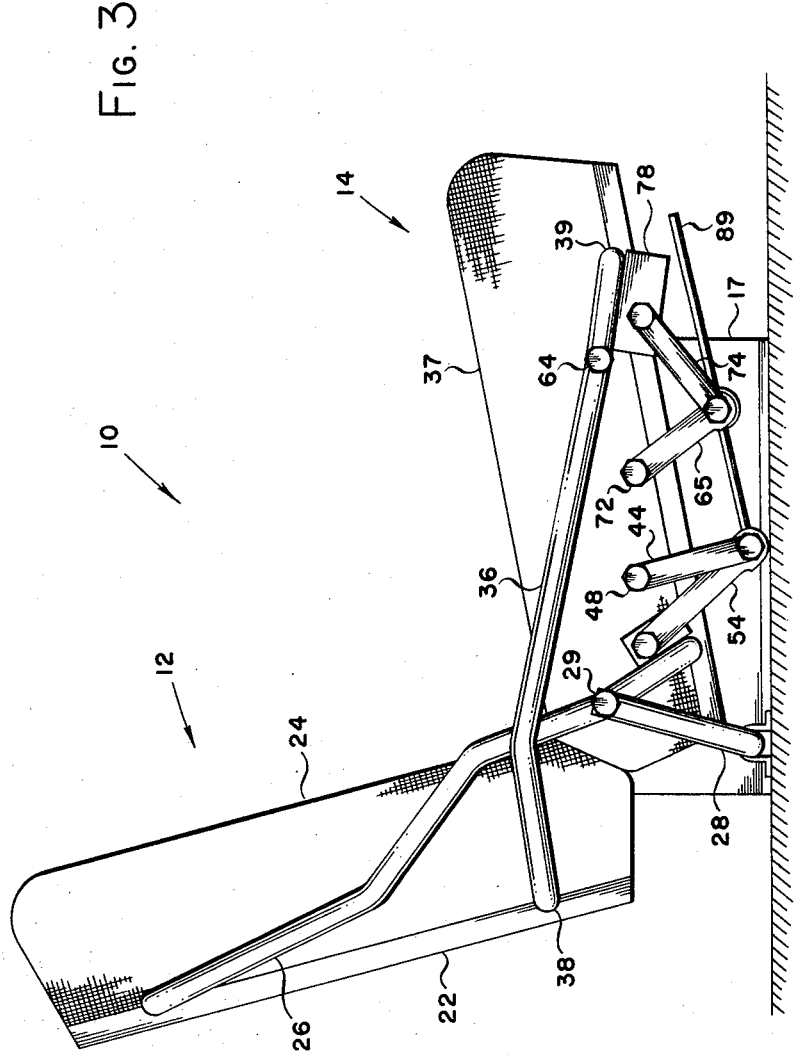
FIGURE 3 is a side elevational view of the seat of FIGURE 2 raised to a left hand seating position.
Figure 4:
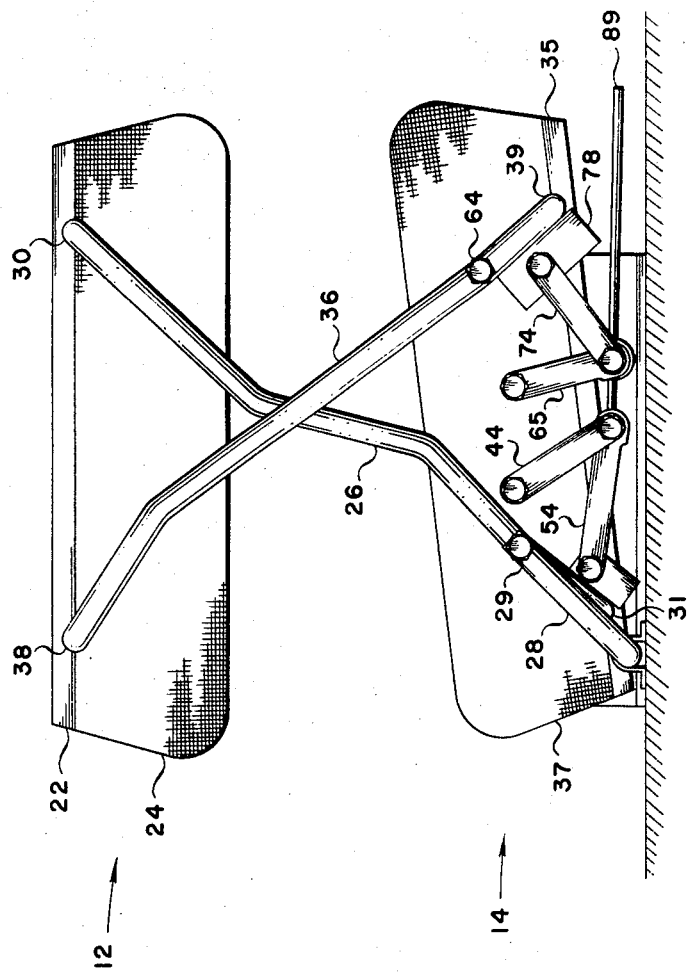
FIGURE 4 is a side elevational view of the seat showing the seat in an intermediate or "tabled" position.
Figure 5:
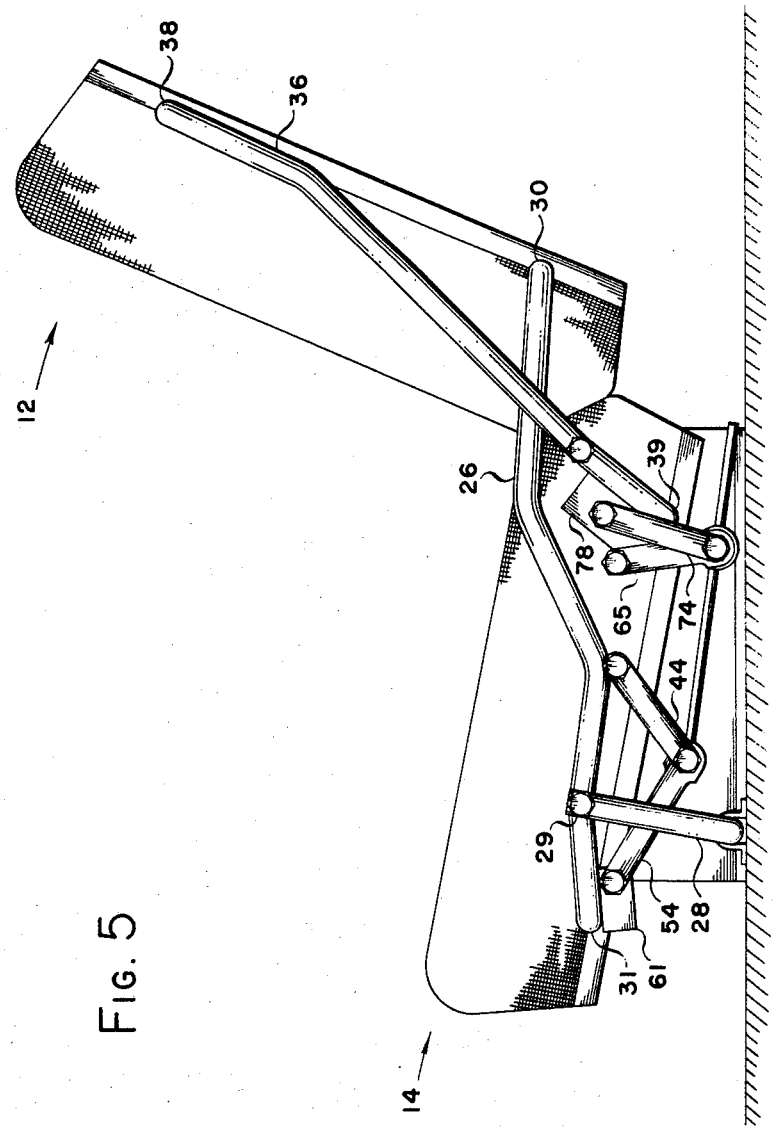
FIGURE 5 is a side elevational view of the seat, similar to FIGURE 3 but with the seat in the right hand seating position.
Figure 6:
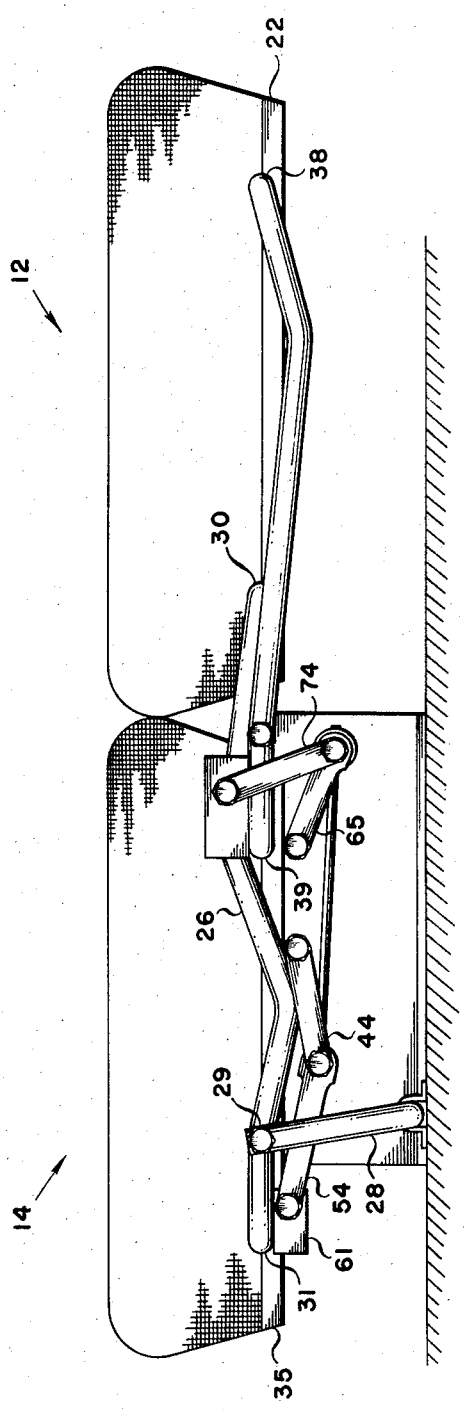
FIGURE 6 is a view similar to FIGURE 2 showing the seat in a right berthed position.

The seat member 14, which may be of similar or identical construction to the back member 12, likewise comprises a relatively rigid seat board 35 secured to a seat supporting member 36 constructed similar to the back supporting member 26 and oriented in a generally horizontal position. The support member 36 is positioned exteriorly of the back support member 26 and is shaped to nest with the latter member. The member 26 is also bent to appropriately nest with respect to the support member 36 in a non-interfering relationship. A cushion 37, shaped for appropriate seating comfort, is secured to the supporting member 36 by means of attachments 38 and 39 such that its position relative to the back member 12 is predeterminate. The directions front and rear as well as right and left, as used herein, are intended to refer to the normal sitting position of the seat 10 when it is positioned as shown in FIGURES 1-3.

The back member 12 is pivotally connected to the base 16 by a pair of rear base bars 44 and 46 which are rotatably mounted to the base sides 17 and 18, respectively, by connectors 48. The rear base bars 44 and 46 are rotatably interconnected at their ends opposite the connectors 48 by means of an intermediately disposed rear cross member 50 and connectors 52. The rear cross member 50 is usually fabricated from a tubing so as to conserve weight and provide adequate rigidity but could, of course, be of other desired structural shape. A pair of rear support bars 54 and 56, characterized by apertures 58 and 60, respectively, adjacent their lower ends, is adapted to receive and rotatably carry the rear cross member 50. At their other ends, the support bars 54 and 56 are rotatably mounted to the back support member via brackets 61 and 62, respectively, by means of connectors 63.

Similarly, the seat member 14 is supported by and pivotally connected to the base 16 by connectors 64 and by a pair of front base bars 65 and 66. The base bars 65 and 66 define apertures 67 and 68, respectively, at one of their ends, which are adapted to receive and rotatably carry the front cross member 70. At their other ends the front base bars 65 and 66 are rotatably mounted to the base sides 17 and 18, respectively, by means of connectors 72. Likewise, front support bars 74 and 76 are rotatably connected at one of their ends to the seat supporting member 36 by means of brackets 78 and 80, respectively, and the connectors 82. At their other ends the front support bars 74 and 76 are rotatably mounted to the front cross member 70 via connectors 84.

Although the described linkage is adequate to constrain the motion of the back member 12 and the seat member 14 to the desired paths, a selective locking mechanism is necessary to retain the members in selected ones of the various desired positions. For this purpose, the locking means 20 is provided. It includes a lock sleeve 85 defining a cylindrically-shaped aperture 86 therethrough which is adapted to receive and be fixedly mounted to the front cross member 70. The lock sleeve 85 is characterized by a transverse aperture 87 which is in alignment with a hole 88 through the front cross member 70. A lock plunger 89, having a plurality of apertures 90 therein, is slidably positionable within the apertures 87 and 88. The lock plunger 89 includes an aperture 92 at its end opposite the lock means 20 which is adapted to receive and be carried by the rear cross member 50. The lock means 20 carries a spring loaded pin 94 for normal engagement into any selected one of the apertures 90. The locking pin 94 may be manually withdrawn from such engagement by pulling upon a handle 96 connected to it via a cable 98, thereby permitting sliding motion between the lock sleeve 85 and the lock plunger 89. Since the back and seat members 12 and 14 are connected to the cross members 50 and 70, their relative positions are thus rigidly fixed by this locking mechanism. The various possible locking positions which the seat 10 is capable of assuming are more specifically illustrated in FIGURES 2-6. Other intermediate positions may of course be facilitated by providing additional apertures 90 in the lock plunger 89 or by utilizing a locking mechanism of alternative configuration.

In summary then, the back member 12 is pivotally mounted to and supported by the base 16 via the connectors 34 and 48 and, likewise, the seat member 14 is pivotally mounted to and carried by the base 16 via the connectors 64 and 72.

As the back member 12 moves in a clockwise manner from the position of FIGURES 1 and 2 to that of FIGURE 3, the seat member 14 moves slightly counterclockwise about its pivot points for seating comfort in the left hand seating position. Further clockwise movement of the back member 12 causes it to move into the "tabled" position of FIGURE 4, the right hand seating position of FIGURE 5 and finally the right hand berthed position of FIGURE 6.

While particular embodiments of the present invention have been shown and described, it will be obvious to those skilled in the art that changes and modifications may be made without departing from this invention in its broader aspects and, therefore, the aim is to cover all such changes and modifications as fall within the true spirit and scope of this invention.

I claim:

1. A seat for supporting a body in selected positions, comprising:
   a base having first and second sides;
   a seat member carried by the base;
   a back member carried by the base;
   a U-shaped support member rotatably mounted at its ends to the back member and pivotally mounted at its corners to the sides of the base;
   a first and second pair of links, the first pair being rotatably mounted at one end to the seat member and the second pair being rotatably mounted at one end to the back member, one link of each pair being disposed adjacent to each of the sides of the base;
   first and second parallel cross members rotatably mounted at their ends to the other ends of the first and second pair of links, respectively; and
   a third and fourth pair of links rotatably mounted at one of their ends to the first and second cross members, respectively, adjacent the first and second pair of links, and at their other ends to the sides of the base, one link of each pair being disposed adjacent each of the sides.

2. The invention of claim 1, including locking means for locking the back member in any predetermined selected position.

3. The invention of claim 1 wherein the seat member is interlinked with the back member so that the seat member moves from one position to another position when the back member is moved from one position to another position.

4. The invention of claim 1 wherein the links and the pivot points are arranged so that the back member is selectively movable from a recumbent position at the first end of the seat member to a sedentary position at the first end of the seat member, to a sedentary position at the second end of the seat member and to recumbent position at the second end of the seat member.

5. The invention of claim 1 wherein either the first end or the second end of the seat member which is adjacent the back member is lower than the other when the back member is away from the recumbent position.

6. The invention of claim 2 wherein the locking means comprises:
   a lock sleeve secured to the first cross member;
   the lock sleeve characterized by an aperture therethrough in register with an aperture through the first cross member;
   a lock plunger rotatably mounted at one end thereof to the second cross member and being slidably disposed at its other end within the apertures in the first cross member and the lock sleeve;

the lock plunger defining a plurality of apertures along its length in selective register with the apertures in the lock sleeve and the first cross member;

a spring loaded pin mounted to the lock sleeve, the pin being urged into engagement with and adapted to extend within the apertures in the lock sleeve and the first cross member, thereby preventing movement of the lock plunger with respect to the lock sleeve and first cross member.

References Cited

UNITED STATES PATENTS

| | | | |
|---|---|---|---|
| 484,434 | 10/1892 | Johnston | 297—102 |
| 831,777 | 9/1906 | Dryer | 297—73 X |
| 2,875,811 | 3/1959 | Fall | 297—102 X |
| 2,926,948 | 3/1960 | Koplin et al. | 297—125 X |
| 2,926,950 | 3/1960 | Hooverson | 297—125 X |
| 3,313,570 | 4/1967 | McVeich | 297—103 |

JAMES T. McCALL, Primary Examiner

U.S. Cl. X.R.

297—72, 119